United States Patent
Boerstler et al.

(10) Patent No.: US 7,225,092 B2
(45) Date of Patent: May 29, 2007

(54) METHOD AND APPARATUS FOR MEASURING AND ADJUSTING THE DUTY CYCLE OF A HIGH SPEED CLOCK

(75) Inventors: David W. Boerstler, Round Rock, TX (US); Eskinder Hailu, Austin, TX (US); Kazuhiko Miki, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 10/970,284

(22) Filed: Oct. 21, 2004

(65) Prior Publication Data

US 2006/0103367 A1    May 18, 2006

(51) Int. Cl.
*G06F 19/00* (2006.01)

(52) U.S. Cl. ......................................... 702/79; 708/103

(58) Field of Classification Search ............ 702/76–78, 702/182–188, 79; 708/103
See application file for complete search history.

(56) References Cited

U.S. PATENT DOCUMENTS 5,948,046 A * 9/1999 Hagberg .................... 708/103

* cited by examiner

*Primary Examiner*—Edward Raymond
(74) *Attorney, Agent, or Firm*—Carr LLP; D'Ann Rifai (57) ABSTRACT

An apparatus, a method, and a computer program are provided to measure the duty cycle of a clocking signal in a processor. Traditionally, variations in the duty cycles of clocks within microprocessors have been of considerable concern. By employing frequency dividers and AND gates, the duty cycles of clocks can be precisely measured and adjusted accordingly to account for variation that might occur. The measurements and adjustments, therefore, can improve the operation of a microprocessor or any other clocked semiconductor.

16 Claims, 6 Drawing Sheets

METHOD AND APPARATUS FOR MEASURING AND ADJUSTING THE DUTY CYCLE OF A HIGH SPEED CLOCK

FIELD OF THE INVENTION

The present invention relates generally to clock signal duty cycles, and more particularly, to on-chip measurement and adjustment of the duty cycle of a clocking signal.

DESCRIPTION OF THE RELATED ART

In digital circuit design, the clocking signal is an extremely important feature. Degradation of a clocking signal can lead to poor performance. With high frequency microprocessor clocking signals, duty cycle variations of the clocking signal leads to signal degradation. This signal degradation is specifically prevalent where the mid cycle edge is utilized. Additionally, functionality can be limited if the clocked circuits, such as dynamic circuits, on the microprocessor depend on minimum up or down time of the clock cycle.

The duty cycle of a clocking signal, however, is dependent on several factors. For example, temperature, circuit design, and loading all affect the duty cycles of clocking signals. Therefore, to be able to properly account for effects that vary the duty cycle, accurate measurement of the duty cycle during normal operation is necessary.

It is not unusual, though, for modern microprocessors to employ multi-gigahertz clocking signals. However, off-chip measurements of such high frequency signals are difficult, requiring specialized lab equipment. The bandwidth of typical off-chip measurement equipment is usually limited to a few hundred megahertz, which is at least one order of magnitude lower than the on-chip clocking signals.

Once the measurement of the duty cycle has been measured, it still should be controlled. Having a measured duty cycle with no means of control in many cases is not very valuable. Therefore, there is a need for a method and/or apparatus for measuring and adjusting the duty cycle of a clocking signal, off-chip that addresses at least some of the problems associated with conventional off-chip duty cycle measurement methods and apparatuses.

SUMMARY OF THE INVENTION

The present invention provides apparatus for measuring duty cycle in a processor. Within the apparatus is a variable duty cycle clock that generates both a clocking signal and an inverted clock signal. The clocking signal and the inverted clocking signal are divided by a first and a second frequency divider, respectively. Then, outputs from the first and the second frequency divider are ANDed to produce an output signal.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1A:
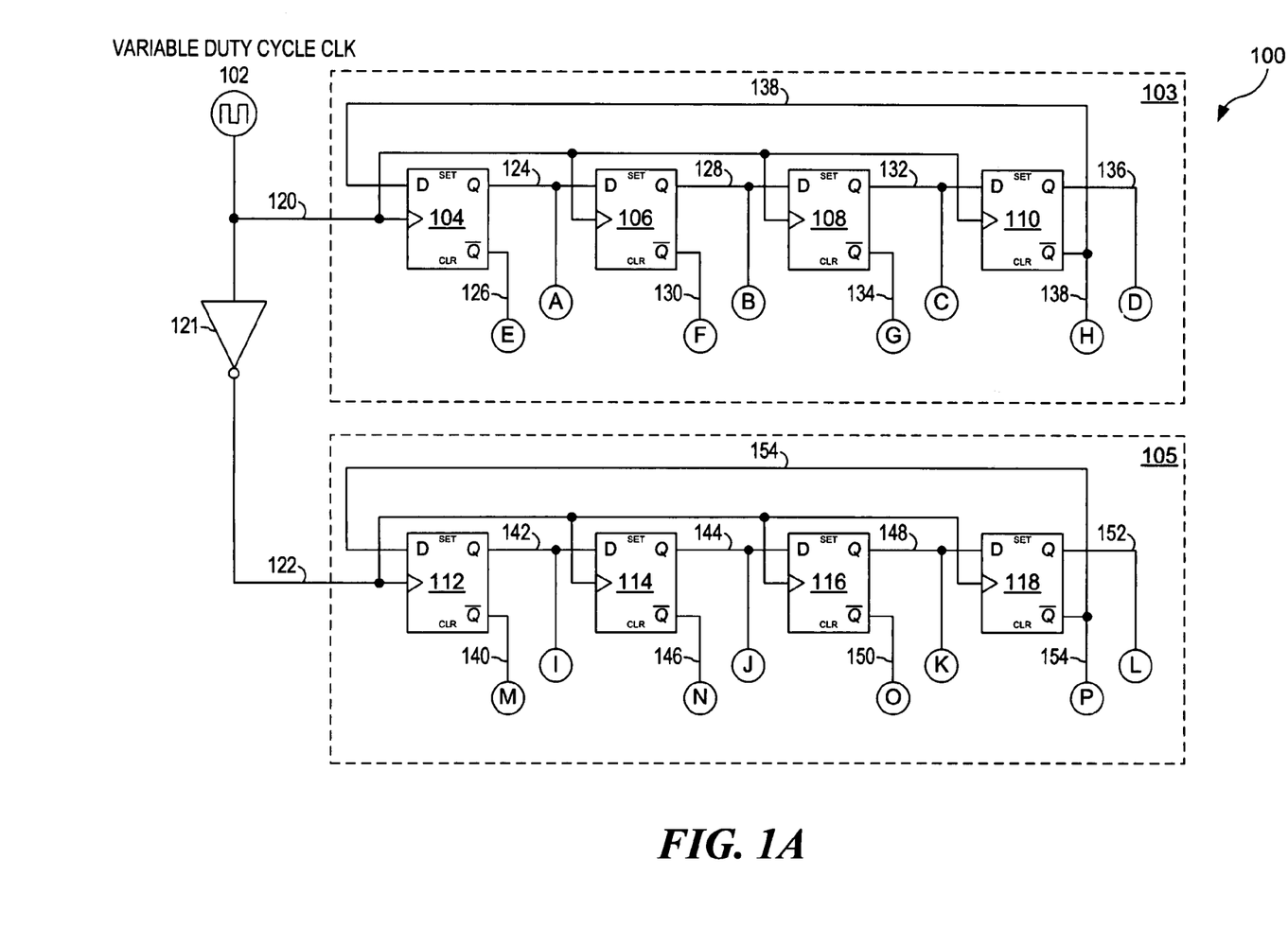
FIGS. 1A and 1B are schematic diagrams depicting a duty cycle measurement and adjustment circuit.
Figure 1B:
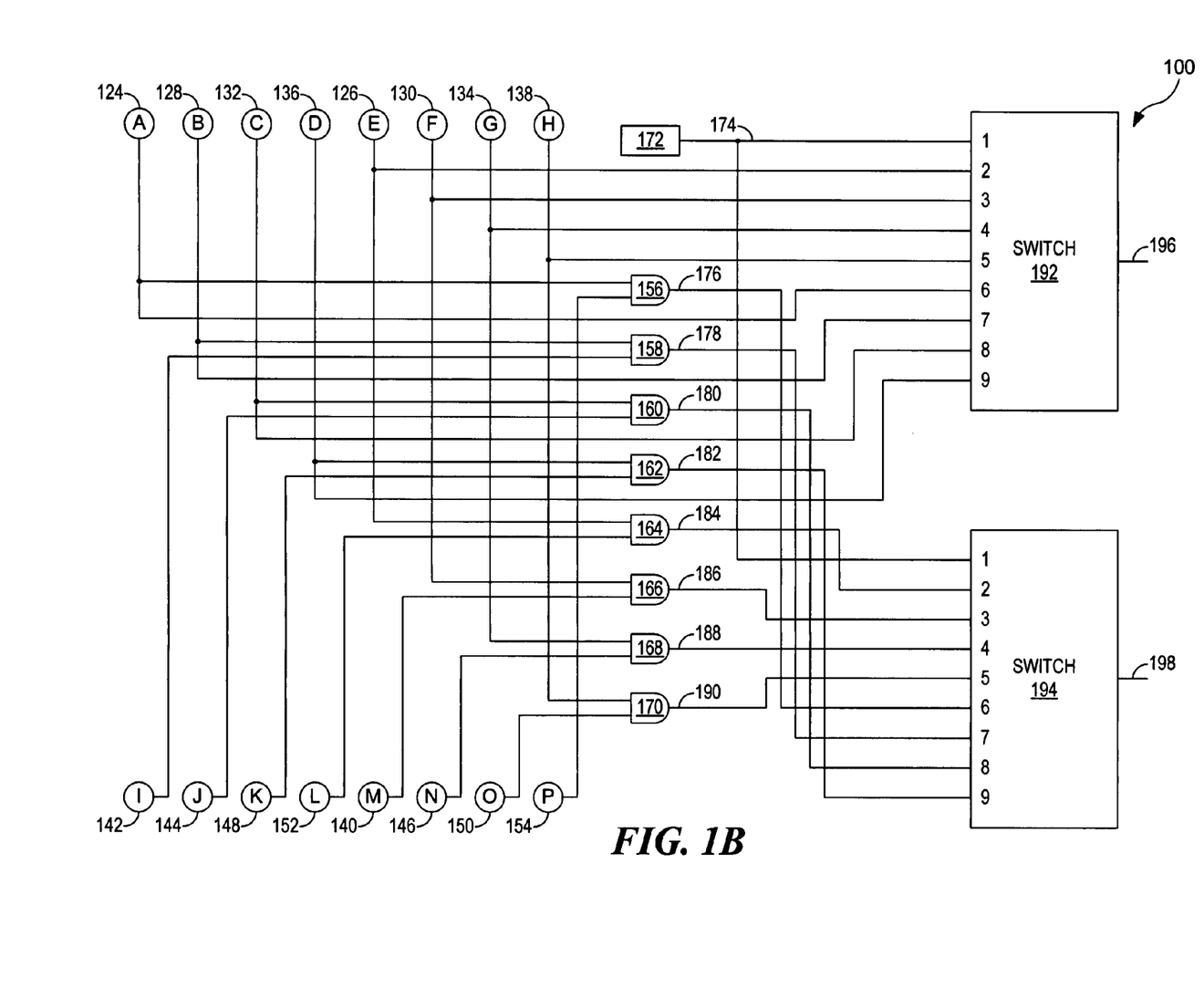

Referring to FIGS. 1A and 1B of the drawings, the reference numeral 100 generally designates a duty cycle measurement and adjustment circuit. The circuit 100 comprises a first frequency divider 103, a second frequency divider 105, a first AND gate 156, a second AND gate 158, a third AND gate 160, a fourth AND gate 162, a fifth AND gate 164, a sixth AND gate 166, a seventh AND gate 168, an eighth AND gate 170, a first switch 192, a second switch 194, a constant input 172, and an inverter 121.

The first frequency divider 103 operates by receiving clocking signals from a clock 102 and dividing the clocking signals. To divide the clocking signals, a number of D flip-flops are employed; however, there are a number of other types of frequency dividing circuit that can be utilized and a number of other latches and flip-flops that can be utilized. The first frequency divider 103 is divide by 8, employing four D flip-flops, but the clocking signal can be divided as many times as desired to make off-chip measurements. The first frequency divider 103 comprises a first D flip-flop 104, a second D flip-flop 106, a third D flip-flop 108, and a fourth D flip-flop 110.

The second frequency divider 105 operates by receiving inverted clocking signals from the clock 102 and dividing the clocking signals. To divide the clocking signals, a number of D flip-flops are employed; however, there are a number of other types of frequency dividing circuit that can be utilized and a number of other latches and flip-flops that can be utilized. The second frequency divider 105 is divide by 8, employing four D flip-flops, but the clocking signal can be divided as many times as desired to make off-chip measurements. The second frequency divider 105 comprises a fifth D flip-flop 112, a sixth D flip-flop 114, a seventh D flip-flop 116, and an eighth D flip-flop 118.

To function, the clock 102 outputs a clocking signal to the first communication channel 120. The first D flip-flop 104, the second D flip-flop 106, the third D flip-flop 108, and the fourth D flip-flop 110 receive the clocking signal to the respecting clocking inputs, such that the D flip-flops 104, 106, 108, and 110 toggle on the rising edge of the clocking signal. Additionally, the inverter 121 receives the clocking signal through the first communication channel 120, and outputs an inverted clocking signal through a second communication channel 122 to the second frequency divider 105. Within the second frequency divider 105, the fifth D flip-flop 112, the sixth D flip-flop 114, the seventh D flip-flop 116, and the eighth D flip-flop 118 receive the clocking signal to the respecting clocking inputs, such that the D flip-flops 112, 114, 116, and 118 toggle on the falling edge of the non-inverted clocking signal.

The first frequency divider 103 employs feedback to perform the frequency division. The first D flip-flop 104 receives a Qbar output from the fourth D flip-flop 110 through a third communication channel 138. A Q output from the first D flip-flop 104 is input into the second D flip-flop 104 through a fourth communication channel 124, and a Q output from the second D flip-flop 106 is input into the third D flip-flop 108 through a fifth communication channel 128. Also, a Q output from the third D flip-flop 108 is input into the fourth D flip-flop 110 through a sixth communication channel 132.

The second frequency divider 105 also employs feedback to perform the frequency division. The fifth D flip-flop 112 receives a Qbar output from the eighth D flip-flop 118 through a seventh communication channel 154. A Q output from the fifth D flip-flop 112 is input into the sixth D flip-flop 114 through an eighth communication channel 142, and a Q output from the sixth D flip-flop 114 is input into the seventh D flip-flop 116 through a ninth communication channel 144. Also, a Q output from the seventh D flip-flop 116 is input into the eighth D flip-flop 118 through a tenth communication channel 148.

Once the clocking signal has been divided, then the various inputs of the frequency dividers can be tapped to make measurements by ANDing various outputs. The first AND gate 156 ANDs the Q output of first D flip-flop 104 and the Qbar output of the eighth D flip-flop 118, which are transmitted to the first AND gate 156 through the fourth communication channel 124 and the seventh communication channel 154, respectively. The second AND gate 158 ANDs the Q output of second D flip-flop 106 and the Q output of the fifth D flip-flop 112, which are transmitted to the second AND gate 158 through the fifth communication channel 128 and the eighth communication channel 142, respectively. The third AND gate 160 ANDs the Q output of third D flip-flop 108 and the Q output of the sixth D flip-flop 114, which are transmitted to the third AND gate 160 through the sixth communication channel 132 and the ninth communication channel 144, respectively. The fourth AND gate 162 ANDs the Q output of fourth D flip-flop 110 and the Q output of the seventh D flip-flop 116, which are transmitted to the fourth AND gate 162 through a fourteenth communication channel 136 and the tenth communication channel 148, respectively. The fifth AND gate 164 ANDs the Qbar output of first D flip-flop 104 and the Q output of the eighth D flip-flop 118, which are transmitted to the fiflh AND gate 164 through an eleventh communication channel 126 and a fifteenth communication channel 152, respectively. The sixth AND gate 166 ANDs the Qbar output of second D flip-flop 106 and the Qbar output of the fifth D flip-flop 112, which are transmitted to the sixth AND gate 166 through a twelfth communication channel 130 and a sixteenth communication channel 140, respectively. The seventh AND gate 168 ANDs the Qbar output of third D flip-flop 108 and the Qbar output of the sixth D flip-flop 114, which are transmitted to the seventh AND gate 168 through a thirteenth communication channel 134 and a seventeenth communication channel 146, respectively. The eighth AND gate 170 ANDs the Qbar output of fourth D flip-flop 110 and the Qbar output of the seventh D flip-flop 116, which are transmitted to the eighth AND gate 170 through the third communication channel 138 and an eighteenth communication channel 150, respectively.

Various outputs from the first frequency divider 103 are input into first switch 192 to allow for selectively choosing outputs to make measurements and/or adjustments. The first switch position of the first switch 192 receives an output from a constant output 172 through a nineteenth communication channel 174. The second switch position of the first switch 192 receives the Qbar output of the first D flip-flop 104 through the eleventh communication channel 126. The third switch position of the first switch 192 receives the Qbar output of the second D flip-flop 106 through the twelflh communication channel 130. The fourth switch position of the first switch 192 receives the Qbar output of the third D flip-flop 108 through the thirteenth communication channel 134. The fifth switch position of the first switch 192 receives the Qbar output of the fourth D flip-flop 110 through the third communication channel 138. The sixth switch position of the first switch 192 receives the Q output of the first D flip-flop 104 through the fourth communication channel 124. The seventh switch position of the first switch 192 receives the Q output of the second D flip-flop 106 through the fifth communication channel 128. The eighth switch position of the first switch 192 receives the Q output of the third D flip-flop through the sixth communication channel 132. The ninth switch position of the first switch 192 receives the Q output of the fourth D flip-flop 110 through the fourteenth communication channel 136.

Various outputs from the AND gates are input into second switch 194 to allow for additional choosing of outputs to make measurements and/or adjustments. The first switch position of the second switch 194 receives an output from a constant output 172 through the nineteenth communication channel 174. The second switch position of the second switch 194 receives an output of the fifth AND gate 164 through a twentieth communication 184. The third switch position of the second switch 194 receives an output of the sixth AND gate 166 through a twenty-first communication channel 186. The fourth switch position of the second switch 194 receives an output of the seventh AND gate 168 through a twenty-second communication channel 188. The fifth switch position of the second switch 194 receives an output of the eighth AND gate 170 through a twenty-third communication channel 190. The sixth switch position of the second switch 194 receives an output of the first AND gate 156 through a twenty-fourth communication channel 176. The seventh switch position of the second switch 194 receives an output of the second AND gate 158 through a twenty-fifth communication channel 178. The eighth switch position of the second switch 194 receives an output of the third AND gate 160 through a twenty-sixth communication channel 180. The ninth switch position of the second switch 194 receives an output of the fourth AND gate 162 through a twenty-seventh communication channel 182.

Figure 2:
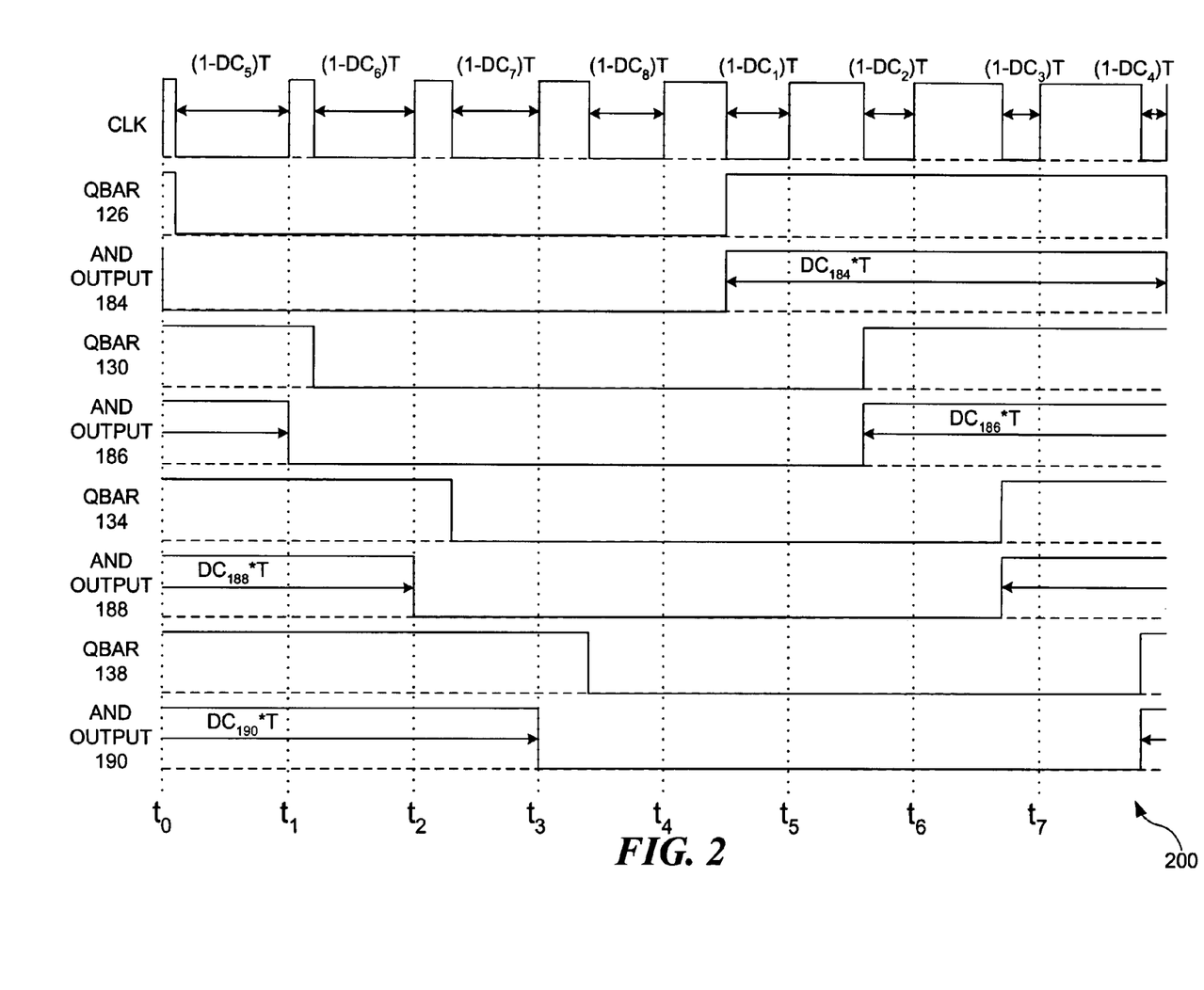
FIG. 2 is a timing diagram depicting the operation of the duty cycle measurement and adjustment circuit.

Based on the ANDed outputs and the output of first frequency divider 103 and the second frequency divider 105, the duty cycle can be measured and adjusted by tapping the various outputs. Referring to FIG. 2 of the drawings, the reference numeral 200 generally designates a timing diagram depicting the operation of the duty cycle measurement and adjustment circuit 100 of FIG. 1.

From the timing, the clocking signal from the clock 102 of FIG. 1 maintains the same period, but the duty cycle varies. The time-up periods steadily increase over the diagram showing that the duty cycle is increasing. From the clocking signals, the output from the first frequency divider 103 through the fourteenth communication channel 136 is aligned with negative clock transitions of the output of the clock 102 and has a period of 8T, where T is the period of the input clock, with a 50% duty cycle.

Between $t_0$ and $t_1$, the Qbar output 126 of the first D flip-flop 104 transitions to logic low. The Qbar output 126 of the first D flip-flop 104 is ANDed with the Q output 152 of the eighth D flip-flop 118 to produce the ANDed output 184. At $t_0$, the ANDed output 184 transitions to logic low. The ANDed output 184 has a period of 8T and an uptime of 3T plus an interval corresponding to the downtime of the clock or $(1-DC)*T$. The interval corresponding to the downtime for the clock in FIG. 2 is 0.5T, or $(1-0.5)*T$, yielding a total uptime period of 3.5T. Since the uptime of the ANDed output 184 is 3.5T, then the downtime is 4.5T.

In general, the period of the outputs is the mT, where m is the frequency divider ratio. However, the duty cycle of the outputs varies depending on which D flip-flop in the first frequency divider makes the measurement. The duty cycle of the outputs is as follows:

$$DC = \{((m/2)-1)*T + (1-DC_n)*T\}/mT \quad (1)$$
$$= (m - 2*DC_n)/2m,$$

where n=1, 2, . . ., (m/2). Since the frequency divider ratio is 8, then n=1, 2, 3, 4. Therefore, for the ANDed output 184, the output is defined as follows for a 50% duty cycle clock:

$$\text{Period} = mT = 8T \quad (2)$$

$$DC_{184} = (m - 2*DC_1)/2m \quad (3)$$
$$= (8 - 2*0.5)/(2*8)$$
$$= 7/16$$
$$= 43.75\%.$$

Each of the respective Qbar outputs of the first frequency divider 103 can be tapped to make similar measurements. In each case, though, the duty cycle of each of the outputs varies depending on the point in the sequence. The transition from logic high to logic low for the second D flip-flop 106, the third D flip-flop 108, and the fourth D flip-flop 110 occur between t1 and t2, between t2 and t3, and between t3 and t4, respectively. For the ANDed output 186, the output is defined as follows for a 60% duty cycle clock:

$$DC_{186} = (m - 2*DC_2)/2m \quad (4)$$
$$= (8 - 2*0.6)/(2*8)$$
$$= 6.8/16$$
$$= 42.5\%.$$

For the ANDed output 188, the output is defined as follows for a 70% duty cycle clock:

$$DC_{188} = (m - 2*DC_3)/2m \quad (5)$$
$$= (8 - 2*0.7)/(2*8)$$
$$= 6.6/16$$
$$= 41.25\%.$$

For the ANDed output 190, the output is defined as follows for an 80% duty cycle clock:

$$DC_{190} = (m - 2*DC_4)/2m \quad (6)$$
$$= (8 - 2*0.8)/(2*8)$$
$$= 6.4/16$$
$$= 40\%.$$

Figure 3:
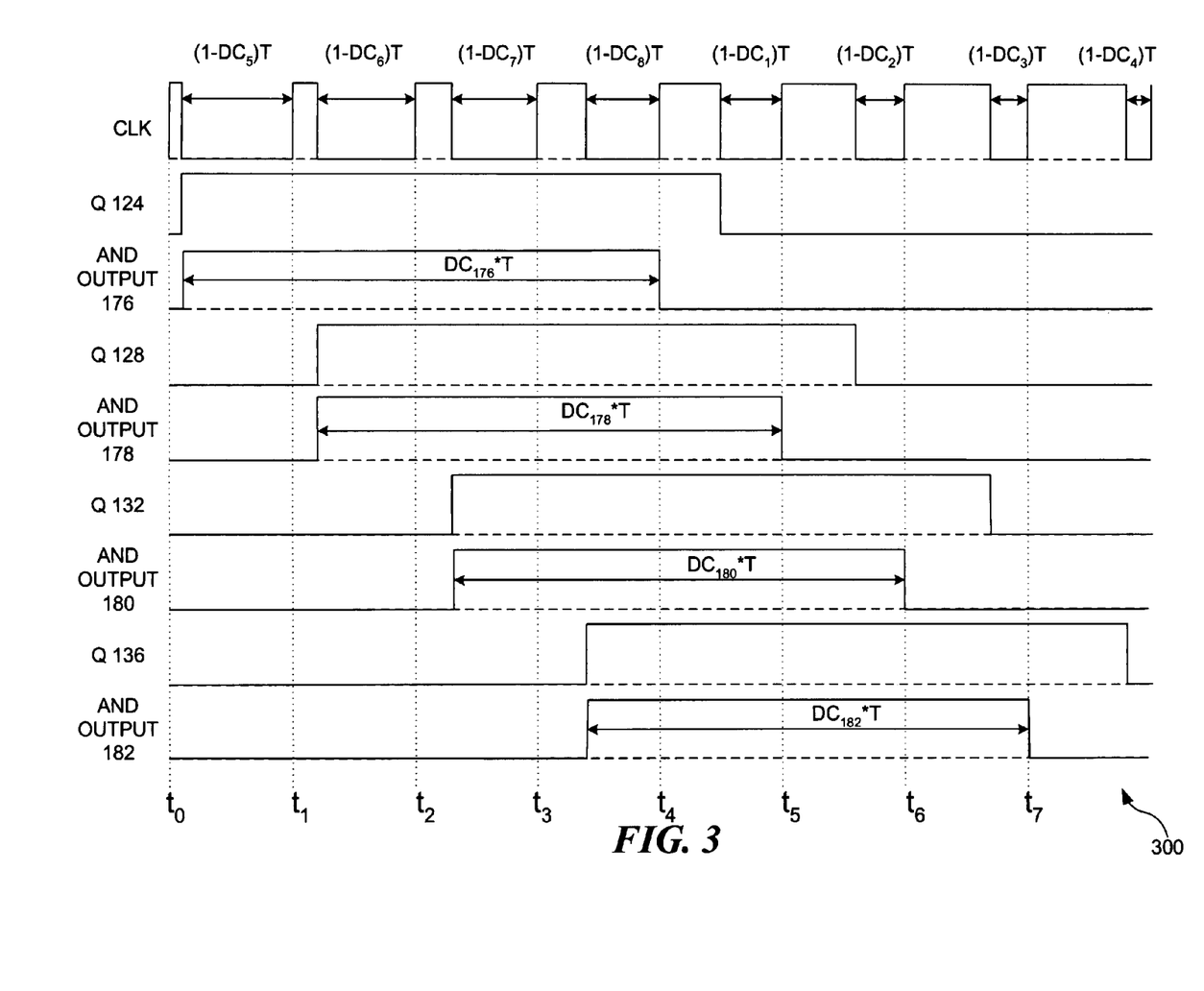
FIG. 3 is a second timing diagram depicting the operation the duty cycle measurement and adjustment circuit.

Referring to FIG. 3 of the drawings, the reference numeral 300 generally designates a timing diagram depicting another operation of the duty cycle measurement and adjustment circuit 100 of FIG. 1.

From the timing, the clocking signal from the clock 102 of FIG. 1 maintains the same period, but the duty cycle varies. The time-up periods steadily increase over the diagram showing that the duty cycle is increasing. From the clocking signals, the output from the first frequency divider 103 through the fourteenth communication channel 136 is aligned with negative clock transitions of the output of the clock 102 and has a period of 8T, where T is the period of the input clock, with a 50% duty cycle.

Between $t_0$ and $t_1$, the Q output 124 of the first D flip-flop 104 transitions to logic high. The Q output 124 of the first D flip-flop 104 is ANDed with the Qbar output 154 of the eighth D flip-flop 118 to produce the ANDed output 176. At sometime after to, the ANDed output 176 transitions to logic high when the clock transitions to logic low. The ANDed output 176 has a period of 8T and an uptime of 3T plus an interval corresponding to the downtime of the clock. The interval corresponding to the uptime for the clock in FIG. 3 is 0.5T, yielding a total uptime period of 3.5T. Since the uptime of the ANDed output 176 is 3.5T, then the downtime is 4.5T.

In general, the period of the outputs is the mT, where m is the frequency divider ratio. However, the duty cycle of the outputs varies depending on which D flip-flop in the first frequency divider makes the measurement. The duty cycle of the outputs is as follows:

$$DC = \{((m/2)-1)*T + (1-DC_n)*T\}/mT \quad (7)$$
$$= (m - 2*DC_n)/2m,$$

where n=(m/2)+1, (m/2)+2, . . ., m. Since the frequency divider ratio is 8, then n=5, 6, 7, 8. Therefore, for the ANDed output 176, the output is defined as follows for a 10% duty cycle clock:

$$\text{Period} = mT = 8T \quad (8)$$

-continued $$DC_{176} = (m - 2 * DC_5)/2m \quad (9)$$
$$= (8 - 2 * 0.1)/(2 * 8)$$
$$= 7.8/16$$
$$= 48.75\%.$$

Each of the respective Qbar outputs of the first frequency divider 103 can be tapped to make similar measurements. In each case, though, the duty cycle of each of the outputs varies depending on the point in the sequence. The transition from logic low to logic high for the second D flip-flop 106, the third D flip-flop 108, and the fourth D flip-flop 110 occur between $t_1$ and $t_2$, between $t_2$ and $t_3$, and between $t_3$ and $t_4$, respectively. For the ANDed output 178, the output is defined as follows for a 20% duty cycle clock:

$$DC_{178} = (m - 2 * DC_6)/2m \quad (10)$$
$$= (8 - 2 * 0.2)/(2 * 8)$$
$$= 7.6/16$$
$$= 47.5\%.$$

For the ANDed output 180, the output is defined as follows for a 30% duty cycle clock:

$$DC_{180} = (m - 2 * DC_7)/2m \quad (11)$$
$$= (8 - 2 * 0.3)/(2 * 8)$$
$$= 7.4/16$$
$$= 46.25\%.$$

For the ANDed output 182, the output is defined as follows for a 40% duty cycle clock:

$$DC_{182} = ((m - 2 * DC_8)/2m \quad (12)$$
$$= (8 - 2 * 0.4)/(2 * 8)$$
$$= 7.2/16$$
$$= 45\%.$$

Figure 4:
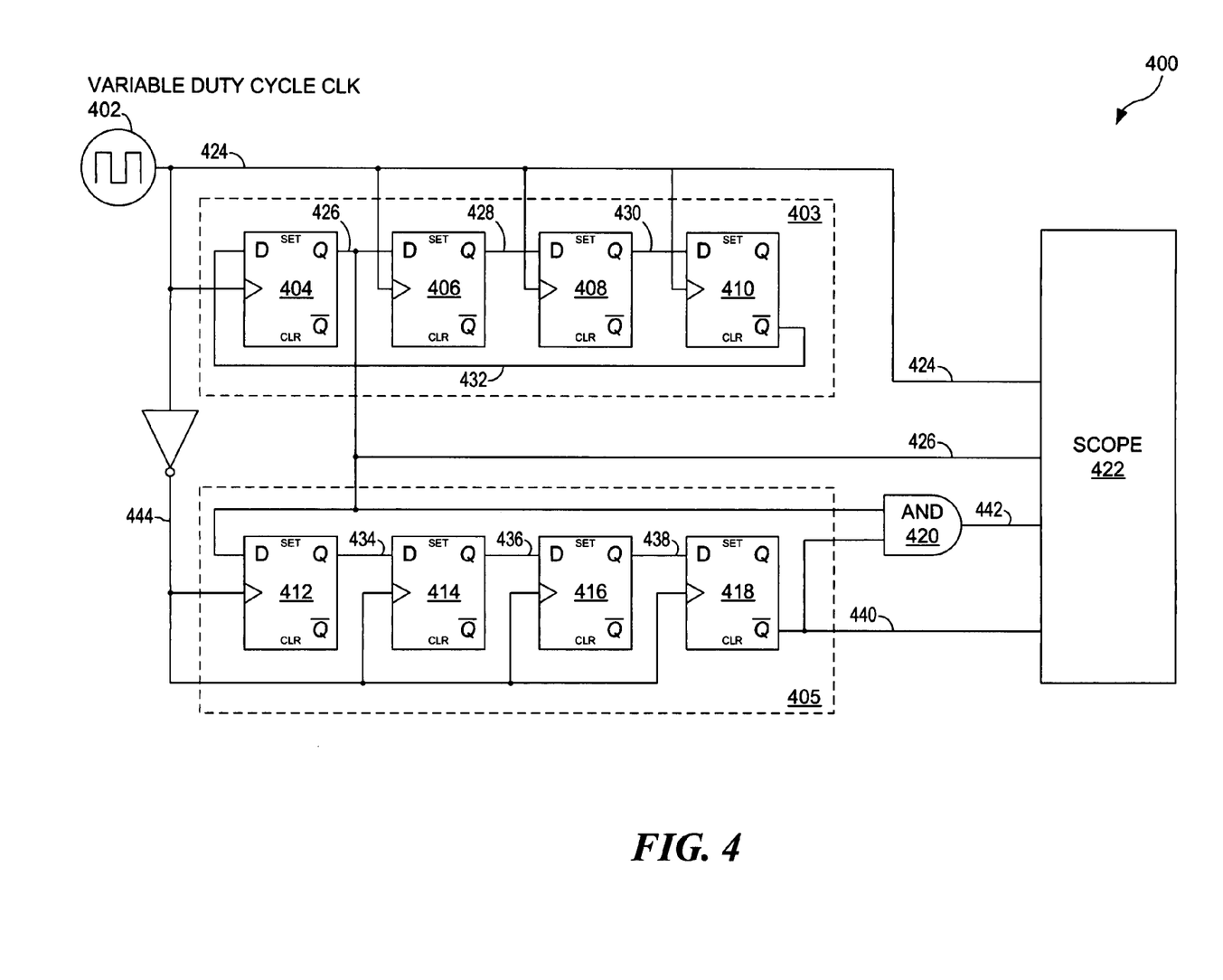
FIG. 4 is block diagram depicting a simplified duty cycle measurement and adjustment circuit.

The duty cycle circuit 100 of FIG. 1 is versatile because of the multiple measurements that can be made; however, a more simplified version of the duty cycle circuit 100 can be employed where the versatility is not desired or needed. Referring to FIG. 4 of the drawings, the reference numeral 400 generally designates a simplified duty cycle measurement and adjustment circuit. The duty cycle circuit 400 comprises a variable duty cycle clock 402, a first frequency divider 403, a second frequency divider 405, an AND gate 420, and an oscilloscope 422.

The first frequency divider 403 is a divide-by-8 divider that triggers on a rising clock edge and that is employed divide the output signal of the variable duty cycle clock 402. The first frequency divider 403 comprises a first D flip-flop 404, a second D flip-flop 406, a third D flip-flop 408, and a fourth D flip-flop 410. Each of the D flip-flops 404, 406, 408, and 410 receive a clocking input through a first communication channel 424.

The D flip-flops 404, 406, 408, and 410 are then ordered into a cascaded arrangement to divide the clocking signal. The first D flip-flop 404 outputs a Q signal to the D input of the second D flip-flop 406 through a second communication channel 426. The second D flip-flop 406 outputs a Q signal to D input of the third D flip-flop 408 through a third communication channel 428. The third D flip-flop 408 outputs a Q signal to the D input of the fourth D flip-flip 410 through a fourth communication channel 430. The Qbar output of the fourth D flip-flop 410 is then fed back to the Q input of the first D flip-flop 404 through a fifth communication channel 432.

The second frequency divider 405 is a divide-by-8 divider that triggers on a falling clock edge and that is employed divide the output signal of the variable duty cycle clock 402. The first frequency divider 405 comprises a fifth D flip-flop 412, a sixth D flip-flop 414, a seventh D flip-flop 416, and an eighth D flip-flop 418. Each of the D flip-flops 412, 414, 416, and 418 receive an inverted clocking input through a sixth communication channel 444.

The D flip-flops 412, 414, 416, and 418 are then ordered into a cascaded arrangement to divide the clocking signal. The Q output of the first D flip-flop 404 is output to the D input of the fifth D flip-flop 412 through the second communication channel 426. The fifth D flip-flop 412 outputs a Q signal to the D input of the sixth D flip-flop 414 through a seventh communication channel 434. The sixth D flip-flop 414 outputs a Q signal to D input of the seventh D flip-flop 416 through an eighth communication channel 436. The seventh D flip-flop 416 outputs a Q signal to the D input of the eighth D flip-flip 418 through a ninth communication channel 438.

Based on the divisions, measurements can then be made. The Q output of the first D flip-flop 404 is ANDed with the Qbar output of the eighth D flip-flop 418. The AND gate 420 then outputs the resultant signal to the scope 422 through a tenth communication channel 442. The clocking signal, the Q output of the first D flip-flop 404, and the Qbar output of the eighth D flip-flop 418 are also input into the scope 422 through the first communication channel 424, the second communication channel 426, and an eleventh communication channel 440. By comparing each of the signals with one another, the duty cycle of the clocking signal can be measured in a manner similar to the measurements of the duty cycle measurements of FIGS. 2 and 3.

Figure 5:
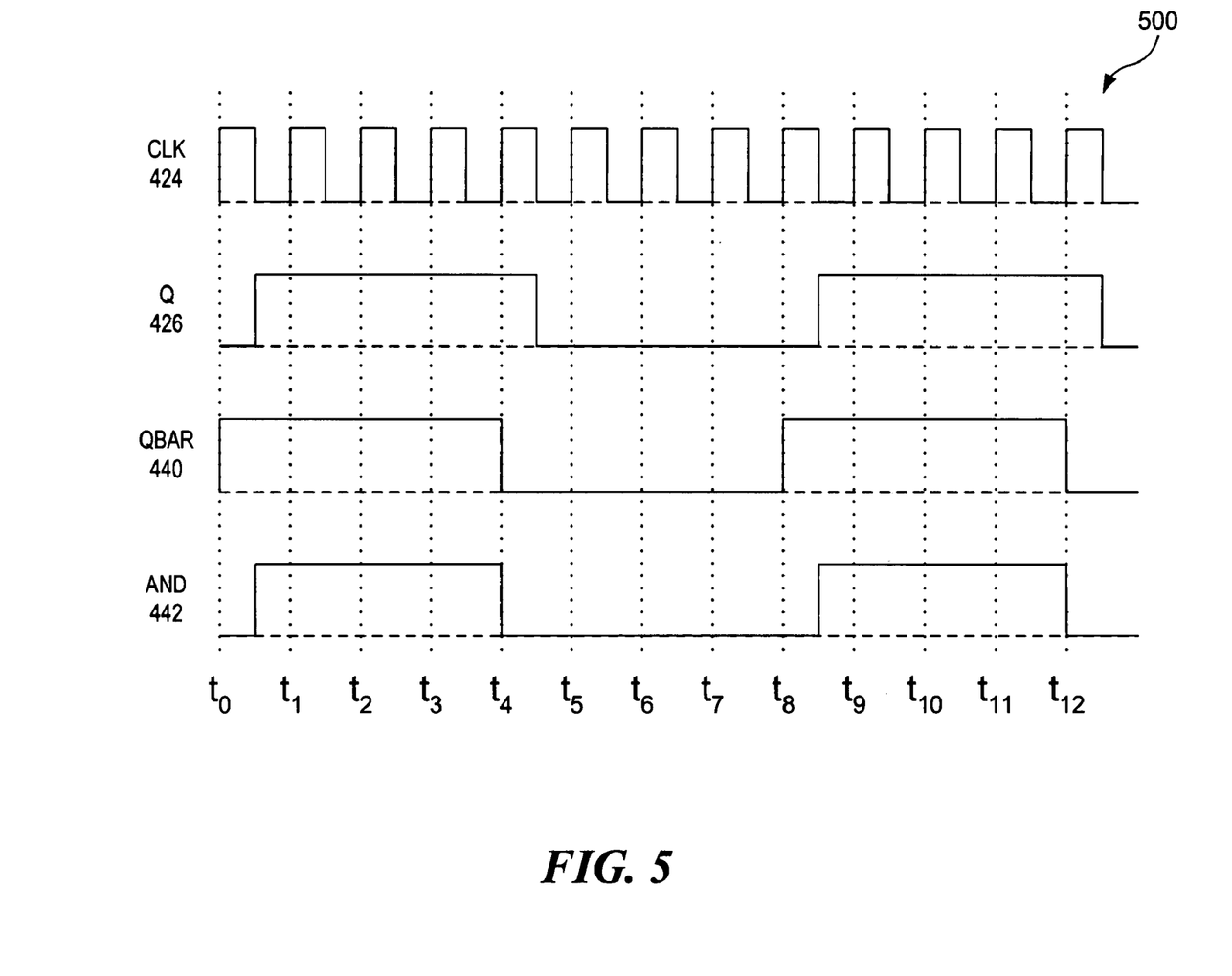
FIG. 5 is a timing diagram depicting the operation of the simplified duty cycle measurement and adjustment circuit.

Referring to FIG. 5 of the drawings the reference numeral 500 generally designates a timing diagram that illustrates the operation of the duty cycle circuit 400. The timing diagram 500 depicts clock output from the first communication channel 424, the ANDed output from the tenth communication channel 442, the Q output of the first D flip-flop 404 from the second communication channel 426, and the Qbar output of eighth D flip-flop 418 from the eleventh communication channel 440.

Between $t_0$ and $t_1$, the operation of the circuit 400 becomes apparent. At to, the Qbar output 440 transitions to logic high. Then, at halfway between $t_0$ and $t_1$, the Q output 426 transitions to logic high. At the halfway point between $t_0$ and $t_1$, the output 442 of the AND gate 420 transitions to logic high. The output 442 of the AND gate 420 transitions back to logic low with the transition of the Qbar output 440 at $t_4$. This pattern is then repeated periodically with the transitions of the output.

The duty cycle of the output of the AND gate 442 can then be determined. Specifically, the output of the AND gate 442 is defined as follows:

$$\text{Period} = mT = 8T \quad (13)$$

$$DC = (3T + (1-DC)T)/8T = (4-DC)/8 = 3.5/8 = 7/16. \quad (14)$$

Therefore, the circuit 400 allows for precise measurement of an output signal's duty cycle.

The real beauty of the duty cycle circuit 100 of FIGS. 1A and 1B and the duty cycle circuit 400 of FIG. 4 is that an output duty cycle can be precisely known and adjusted. The circuits 100 and 400 allow for on-chip placements of efficient circuits that can measure and adjust for clocking signals to achieve the desired duty cycles. Hence, more precision within microprocessors as a result of the more precise control of clocking signals will reduce the number of potential errors and increase the overall efficiency of microprocessors, as well as other clocked semiconductor devices.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for measuring duty cycle in a processor, comprising:
    a variable duty cycle clock means for generating a clocking signal and an inverted clock signal;
    a first frequency divider responsive to said clocking signal;
    wherein the first frequency divider comprises a plurality of latches coupled in serial, comprising at least a first latch and a last latch, each latch comprising an input and an output, wherein the input of each latch comprises only the output of the previous latch, and wherein the input of the first latch comprises only an inverted output of the last latch;
    a second frequency divider responsive to said inverted clocking signal;
    a plurality of AND gates each having a different pair of inputs, with each input of each of said pair corresponding to a different signal from said first frequency divider and said second frequency divider;
    a first multiport switch interconnected to said first frequency divider; and
    a second multiport switch interconnected to said plurality of AND gates.

2. The apparatus of claim 1, wherein the first frequency divider comprises a plurality of cascaded D flip-flops.

3. The apparatus of claim 1, wherein the second frequency divider comprises a plurality of latches.

4. The apparatus of claim 1, wherein the second frequency divider comprises a plurality of cascaded D flip-flops.

5. The apparatus of claim 1, wherein the second frequency divider comprises a plurality of latches coupled in serial, comprising at least a first latch and a last latch, each latch comprising an input and an output, wherein the input of each latch comprises only the output of the previous latch, and wherein the input of the first latch comprises only an inverted output of the last latch.

6. An apparatus for measuring duty cycle in a processor, comprising:
    a variable duty cycle clock for generating a clocking signal and an inverted clock signal;
    a first latch chain responsive to said clocking signal that at least produces a first output signal;
    wherein the first latch chain comprises a plurality of latches coupled in serial, comprising at least a first latch and a last latch, each latch comprising an input and an output, wherein the input of each latch comprises only the output of the previous latch, and wherein the input of the first latch comprises only an inverted output of the last latch;
    a second latch chain responsive to said inverted clocking signal that at least produces a second output signal; and
    at least one AND gate that ANDs the first output signal and the second output signal.

7. The apparatus of claim 6, wherein the first latch chain comprises a plurality of cascaded D flip-flops.

8. The apparatus of claim 7, wherein the first output signal is an output of a first D flip-flop of the plurality of cascaded D flip-flops.

9. The apparatus of claim 6, wherein the second latch chain comprises a plurality of cascaded D flip-flops.

10. The apparatus of claim 9, wherein the first output signal is an output of a last D flip-flop of the plurality of cascaded D flip-flops.

11. A method for measuring duty cycle in a processor, comprising:
    generating a clocking signal and an inverted clocking signal;
    generating a plurality of divided clocking signals from the clocking signal;
    wherein generating the plurality of divided clocking signals comprises:
        inputting the clocking signal into a plurality of cascaded latches;
        outputting the plurality of divided clocking signals from various latches of the plurality of cascaded latches; and
        wherein the plurality of cascaded latches are coupled in serial, comprising at least a first latch and a last latch, each latch comprising an input and an output, wherein the input of each latch comprises only the output of the previous latch, and wherein the input of the first latch comprises only an inverted output of the last latch;
    generating a plurality of inverted, divided clocking signals from the inverted clocking signal; and
    ANDing different pairs of inputs, with each input of each of said pair corresponding to a different divided clocking signal and a different divided, inverted clocking signal.

12. The method of claim 11, wherein the step of generating the plurality of divided, inverted clocking signals further comprises:
inputting the clocking signal into a plurality of cascaded latches; and
outputting the plurality of divided, inverted clocking signals from various latches of the plurality of cascaded latches.

13. The method of claim 11, wherein the method further comprises calculating a duty cycle of an ANDed input pair based on characteristics of each input of the ANDed input pair.

14. A computer program product for measuring duty cycle in a processor, the computer program having a medium with a computer program embodied thereon, the computer program comprising:
computer code for generating a clocking signal and an inverted clocking signal;
computer code for generating a plurality of divided clocking signals from the clocking signal;
wherein the computer code for generating the plurality of divided clocking signals comprises:
computer code for inputting the clocking signal into a plurality of cascaded latches;
computer code for outputting the plurality of divided clocking signals from various latches of the plurality of cascaded latches; and
wherein the plurality of cascaded latches are coupled in serial, comprising at least a first latch and a last latch, each latch comprising an input and an output, wherein the input of each latch comprises only the output of the previous latch, and wherein the input of the first latch comprises only an inverted output of the last latch;
computer code for generating a plurality of inverted, divided clocking signals from the inverted clocking signal; and
computer code for ANDing different pairs of inputs, with each input of each of said pair corresponding to a different divided clocking signal and a different divided, inverted clocking signal.

15. The computer program product of claim 14, wherein the computer code for generating the plurality of divided, inverted clocking signals further comprises:
computer code for inputting the clocking signal into a plurality of cascaded latches; and
computer code for outputting the plurality of divided, inverted clocking signals from various latches of the plurality of cascaded latches.

16. The computer program product of claim 14, wherein the computer program product further comprises computer code for calculating a duty cycle of an ANDed input pair based on characteristics of each input of the ANDed input pair.

* * * * *